2,837,515

HALOGENATION PROCESS FOR CONVERTING $\Delta^7$-ALLOSTEROIDS TO $\Delta^{7,9(11)}$-ALLOSTEROIDS John M. Chemerda, Metuchen, and Theodore A. Jacob, Cranford, N. J., assignors to Merck & Co., Inc., Rahway, N. J., a corporation of New Jersey No Drawing. Application November 22, 1952
Serial No. 322,162

25 Claims. (Cl. 260—239.55)

This invention is concerned generally with the preparation of $\Delta^{7,9(11)}$-steroid-dienes. More particularly, it relates to a novel process for converting $\Delta^7$-cyclopentanopolyhydrophenanthrene compounds of the allo series to the corresponding $\Delta^{7,9(11)}$-allo-cyclopentanopolyhydrophenanthrene compounds, and to the intermediate compounds thus obtained. The $\Delta^{7,9(11)}$-allo-cyclopentanopolyhydrophenanthrene compounds prepared in accordance with our novel procedure are valuable as intermediates in the synthesis of steroid compounds having an oxygen atom attached to the 11-carbon atom, such as the adrenal hormones, corticosterone, cortisone and hydrocortisone using the methods described in the following articles: JACS 73, 2396; JACS 73, 4052; and Nature 168, 28.

The $\Delta^{7,9(11)}$ - allo-cyclopentanopolyhydrophenanthrene compounds, subject of the present invention, have at rings B and C the following chemical structure:

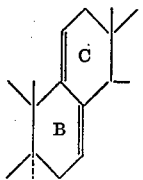

These $\Delta^{7,9(11)}$-allo-cyclopentanopolyhydrophenanthrene compounds can be prepared as follows: A $\Delta^7$-allo-cyclopentanopolyhydrophenanthrene compound (compound 1 hereinbelow) is reacted with a halogenating agent to form the corresponding $\Delta^8$-7,11-dihalo-allo-cyclopentanopolyhydrophenanthrene compound (compound 2), which is reacted with a dehalogenating agent to produce the corresponding $\Delta^{7,9(11)}$-allo-cyclopentanopolyhydrophenanthrene compound (compound 3).

The reactions indicated hereinabove may be chemically represented, insofar as the changes taking place in rings B and C are concerned, as follows:

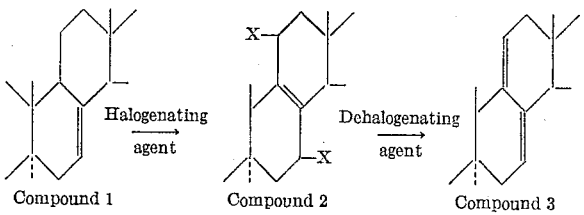

wherein X is a chloro or bromo radical.

The $\Delta^7$-allo-cyclopentanopolyhydrophenanthrene compounds which we ordinarily employ as starting materials in our novel process are those having a sterol side chain attached to the carbon atom in the 17-position of the molecule as for example $\Delta^{7,22}$-ergostadiene compounds such as $\Delta^{7,22}$-3-acyloxy-ergostadiene, $\Delta^{7,22}$-3-acetoxy-ergostadiene, $\Delta^{7,22}$-stigmastadiene compounds, such as $\Delta^{7,22}$-3-acyloxy-stigmastadiene, $\Delta^{7,22}$-3-acetoxy-stigmastadiene, a degraded bile acid side chain attached to the 17-carbon atom such as $\Delta^7$-3-acyloxy-bisnorallocholenic acid, $\Delta^7$-3-acetoxy-bisnorallocholenic acid, a 17-acetyl substituent such as $\Delta^7$-3-acyloxy-20-keto-allopregnene, $\Delta^7$-3-acetoxy-20-keto-allopregnene, a sapogenin side chain, as, for example, $\Delta^7$-dehydrotigogenin compounds such as $\Delta^7$-dehydrotigogenin acylate, $\Delta^7$-dehydrotigogenin acetate, and the like.

These $\Delta^7$-allo-cyclopentanopolyhydrophenanthrene compounds utilized as starting materials in our process, can be prepared starting with the readily available $\Delta^5$-cyclopentanopolyhydrophenanthrene compounds, such as ergosterol, diosgenin, and the like, by treating said $\Delta^5$-allo-cyclopentanopolyhydrophenanthrene compound (compound 4 hereinbelow) with N-bromosuccinimide to form the corresponding $\Delta^5$-7-bromo-cyclopentanopolyhydrophenanthrene compound (compound 5), reacting the latter compound with a tertiary amine to form the corresponding $\Delta^{5,7}$ - cyclopentanopolyhydrophenanthrene compound (compound 6), and reacting said $\Delta^{5,7}$-cyclopentanopolyhydrophenanthrene compound with hydrogen in the presence of Raney nickel catalyst thereby selectively reducing the unsaturated linkage attached to the C–5 carbon atom to form the corresponding $\Delta^7$-allo-cyclopentanopolyhydrophenanthrene compound (compound 1). The reactions indicated hereinabove may be chemically represented, insofar as the chemical changes taking place in rings B and C are concerned, as follows:

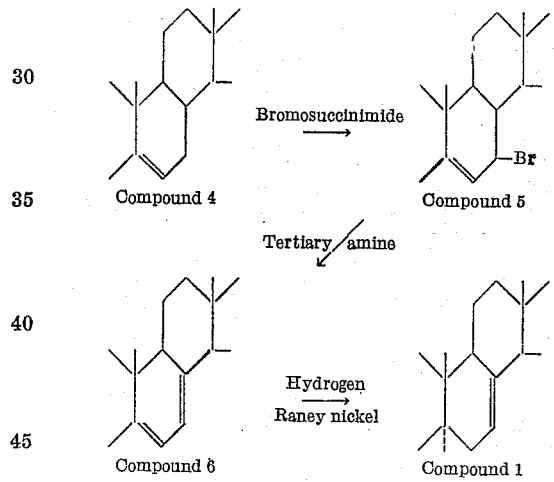

As set forth hereinabove our novel process for converting $\Delta^7$ - allo - cyclopentanopolyhydrophenanthrene compounds to the corresponding $\Delta^{7,9(11)}$ - allo - cyclopentanopolyhydrophenanthrene compounds involves reacting said $\Delta^7$ - allo - cyclopentanopolyhydrophenanthrene compound with a halogenating agent and reacting the polyhalogenated intermediate thus obtained with a dehalogenating agent. We ordinarily conduct this halogenation reaction utilizing a brominating agent since the bromination reaction takes place readily with the formation of high yields of the corresponding polybrominated intermediate, and because this polybrominated intermediate can, in turn, be readily dehalogenated to produce the desired $\Delta^{7,9(11)}$-allo-cyclopentanopolyhydrophenanthrene compound. We ordinarily employ bromine as the brominating agent. The optimum amount of bromine for the reaction is three to five moles of bromine per mole of steroid, when the compound used as starting material is a $\Delta^7$-allocyclopentanopolyhydrophenanthrene compound containing an unsaturated C–17 side chain as, for example, a $\Delta^{7,22}$-ergostadiene compound, a $\Delta^{7,22}$-stigmastadiene compound, and the like. When the compound used as starting material is a $\Delta^7$-allo-cyclopentanopolyhydrophenanthrene compound containing a saturated C–17 side chain as, for example a $\Delta^7$-dehydrosapogenin such as $\Delta^7$-dehydrotigogenin, optium results are secured with as little as two moles of bromine per mole of the $\Delta^7$-allo-cyclopentanopolyhydrophenanthrene compound. The larger requirement for bromine in the case of the steroid compounds containing an unsaturated side chain can be explained by the fact that the olefinic linkage in the side chain is readily brominated, thus consuming one additional mole of reagent, whereas substitution of bromine in a saturated steroid side chain takes place relatively slowly.

The bromination reaction is ordinarily conducted by adding bromine to a solution of the $\Delta^7$-allo-cyclopentanopolyhydrophenanthrene compound, preferably in the cold. As solvent for the reaction, we employ an organic solvent substantially inert to halogenation as, for example, a chlorinated hydrocarbon solvent such as chloroform, carbon tetrachloride, a hydrocarbon solvent such as toluene, a dialkyl ether such as diethyl ether, dibutyl ether, and the like.

The temperature at which the bromination reaction can be carried out is determined by the stability of the polybrominated intermediates in the particular solvent utilized for the reaction, and also by the freezing point of said solvent. For example, when carbon tetrachloride (which freezes at about $-23°$ C.) is employed, we have found that the reaction can be conducted at a temperature of about $-20°$ C. since the polybrominated intermediates are relatively stable in carbon tetrachloride solution at this temperature. When halogenated solvents other than carbon tetrachloride, or when dialkyl ethers are used as the reaction medium, it has been found, however, that the polybrominated intermediates are relatively unstable at temperatures above $-25°$ C.; when these latter solvents are employed, we ordinarily employ reaction temperatures below $-30°$ C. It is presently preferred to conduct the reaction utilizing chloroform as the solvent for the reaction, this solvent having been found to give optimum yields, and to employ a temperature within the range of about $-50°$ C. to $-65°$ C. If desired, the bromination reaction can be carried out utilizing temperatures substantially below $-65°$ C. utilizing ethereal solutions as the solvent medium. At such low reaction temperatures, however, the rate of reaction is substantially decreased, and the high yields obtained using our preferred reaction conditions, chloroform at about $-50$ to $-65°$ C., are not greatly improved.

The time required for carrying out the bromination reaction varies somewhat depending on mechanical factors such as efficiency of mixing, etc. The rate at which the reaction takes place is, however, readily ascertainable by observance of the disappearance of the bromine color from the reaction solution. Where two moles of bromine are reacted with one mole of a $\Delta^7$-allo-cyclopentanopolyhydrophenanthrene compound containing a saturated C-17 side chain, or where three moles of bromine are reacted with one mole of a $\Delta^{7,22}$-allo-cyclopentanopolyhydrophenanthrene compound, the completion of the reaction is readily detected by the complete disappearance of the bromine color from the reaction solution. Where bromine is employed slightly in excess of the above ratios, the bromine-induced color disappears very slowly, and when the excess bromine is of the order of one molecular equivalvent, the bromine color is never discharged completely. We have ascertained that, utilizing our preferred solvent and reaction temperature, and employing four molecular equivalents of bromine per mole of $\Delta^7$-allo-cyclopentanopolyhydrophenanthrene compound, the reaction is ordinarily complete after a reaction period of about four hours.

The method of bringing the reactants together in the reaction solution is not critical. The bromine can be added portionwise, either as liquid bromine or dissolved in an organic solvent inert to bromine, directly to the cold solution containing the $\Delta^7$-allo-cyclopentanopolyhydrophenanthrene compound. Alternatively, a solution of bromine in the reaction solvent, and a solution of the steroid compound, both cooled to the reaction temperature, can be mixed rapidly, and the resulting mixture stirred until the bromination reaction is substantially complete.

Instead of utilizing bromine alone as the brominating agent, we can use an N-bromamide such as N-bromosuccinimide, N-bromoacetamide, and the like, in conjunction with a relatively small amount of bromine which serves to initiate the reaction. The quantity of bromine which we use ranges, depending on whether or not the $\Delta^7$-allo-cyclopentanopolyhydrophenanthrene compound contains an unsaturated C-17 side chain, from a trace of bromine up to an amount slightly in excess of one molecular equivalent. The N-bromamide apparently does not brominate directly but, instead, serves as a source of free bromine in the following way: The free bromine used in conjunction with the N-bromamide undergoes a substitution reaction with the $\Delta^7$-allo-cyclopentanopolyhydrophenanthrene compound with the resultant formation of free hydrogen bromide; the hydrogen bromide, thus liberated, reacts with the N-bromamide thereby generating additional bromine which, in turn, undergoes reaction with the steroid compound. The foregoing cycle is repeated until formation of the polybrominated intermediate is complete. In $\Delta^7$-allo-cyclopentanopolyhydrophenanthrene compounds having a saturated C-17 side chain as, for example, in compounds belonging to the sapogenin series, only a trace of bromine or of hydrobromic acid itself need be used in conjunction with the N-bromamide. Trace amounts of bromine suffice here because reactions involving $\Delta^7$-allo-cyclopentanopolyhydrophenanthrene compounds are substitution reactions; hydrobromic acid is thus continually liberated, and will, in turn, continually generate bromine by reaction with the N-bromamide component of the reaction mixture. In the case of $\Delta^7$-allo-cyclopentanopolyhydrophenanthrene compounds containing an unsaturated C-17 side chain such as $\Delta^{7,22}$-ergostadiene compounds and $\Delta^{7,22}$-stigmastadiene compounds, we ordinarily utilize a slight excess above one molecular equivalent of bromine in conjunction with the N-bromamide. This is necessary because the addition of bromine at the $\Delta^{22}$-ethylenic linkage (which takes place concurrently with nuclear bromination in rings B and C) does not produce the hydrobromic acid essential for generating additional bromine by reaction with the N-bromamide. Irrespective of whether the $\Delta^7$-allo-cyclopentanopolyhydrophenanthrene compound contains a saturated or unsaturated C-17 side chain, we ordinarily utilize two to three moles of the N-bromamide per mole of the steroid compound. We prefer to use approximately two moles of N-bromosuccinimide.

Instead of utilizing a brominating agent, we can also employ a chlorinating agent as, for example, chlorine or an N-chloroamide such as N-chloroacetamide, N-chlorosuccinimide, and the like, in conjunction with a relatively small amount of chlorine or of hydrogen chloride to initiate the reaction in accordance with the reaction mechanism described hereinabove in connection with the employment of the N-bromamides. The reaction conditions which we use when employing these chlorinating agents are substantially identical to those used with the corresponding brominating agents, and the polychlorinated intermediates thus formed correspond in structure to the polybrominated intermediates referred to hereinabove. We prefer to use the brominating agents, however, for the reason that the polychlorinated intermediates are less readily dehalogenated than the corresponding polybrominated derivatives. Other halogenating agents such as iodinating agents, fluorinating agents, and the like, are unsatisfactory in our over-all procedure, since the iodinating agents are not sufficiently active to form the corresponding polyiodinated intermediates and since, in cases where fluorinating agents are employed, defluorination of the polyfluorinated intermediate has not proven to be practical.

In accordance with the foregoing halogenation procedure, there are obtained novel polyhalogenated steroid compounds including $\Delta^8$-7,11-dihalo-allo-cyclopentanopolyhydrophenanthrene compounds as, for example, $\Delta^8$-7,11,22,23-tetrahalo-ergostene compounds such as $\Delta^8$-3-acyloxy-7,11,22,23-tetrahalo-ergostene, $\Delta^8$-3-acyloxy-7,11,22,23-tetrabromo-ergostene, $\Delta^8$-3-acetoxy-7,11,22,23-tetrabromo-ergostene, $\Delta^8$-3-acetoxy-7,11,22,23-tetrachloro-ergostene, $\Delta^8$-7,11,22,23-tetrahalo-stigmastene compounds such as $\Delta^8$-3-acyloxy-7,11,22,23-tetrahalo-stigmastene, $\Delta^8$-3-acyloxy-7,11,22,23-tetrabromo-stigmastene, $\Delta^8$-3-acetoxy-7,11,22,23-tetrabromo-stigmastene, $\Delta^8$-3-acetoxy-7,11,22,23-tetrachloro-stigmastene, $\Delta^8$-7,11-dihalo-dehydrosapogenin compounds, $\Delta^8$-7,11-dihalo-dehydrotigogenin compounds such as $\Delta^8$-7,11-dihalo-dehydrotigogenin acylate, $\Delta^8$-7-11-dibromo-dehydrotigogenin acylate, $\Delta^8$-7,11-dibromo-dehydrotigogenin acetate, $\Delta^8$-7,11-dichloro-dehydrotigogenin acetate, $\Delta^{8,22}$-7,11-dihalo-ergostadiene compounds such as $\Delta^{8,22}$-3-acyloxy-7,11-dibromo-ergostadiene, $\Delta^{8,22}$-3-acetoxy-7-11-dibromo-ergostadiene, $\Delta^{8,22}$-3-acetoxy-7-11-dichloro-ergostadiene, $\Delta^{8,22}$-7,11-dihalostigmastadiene compounds such as $\Delta^{8,22}$-3-acyloxy-7,11-dibromo-stigmastadiene, $\Delta^{8,22}$-3-acetoxy-7,11-dibromo-stigmastadiene, $\Delta^{8,22}$-3-acetoxy-7,11-dichloro-stigmastadiene, as well as polybrominated intermediates containing four bromo substituents attached in rings B and C as, for example, 7,8,9,11,22,23-hexahalo-ergostane compounds such as 3-acyloxy-7,8,9,11,22,23-hexabromo-ergostane, 3-acetoxy-7,8,9,11,22,23-hexabromo-ergostane, 7,8,9,11,22,23-hexachloro-ergostane, 7,8,9,11,22,23-hexahalo-stigmastane compounds such as 3-acyloxy-7,8,9,11,22,23-hexabromo-stigmastane, 3-acetoxy-7,8,9,11,22,23-hexabromo-stigmastane, 7,8,9,11-tetrahalo-tigogenin compounds such as 7,8,9,11-tetrabromo-tigogenin acylate, 7,8,9,11-tetrabromo-tigogenin acetate, and polyhalogenated sapogenin compounds wherein the saturated C–17 side chain contains one or more bromo or chloro substituents, and the like.

The novel polyhalogenated steroid compounds which may be prepared in accordance with our process also include $\Delta^7$-9,11-dihalo-allo-cyclopentanopolyhydrophenanthrene compounds, as for example, $\Delta^7$-3-acyloxy-9,11,22,23-tetrahalo-ergostene, $\Delta^7$-3-acetoxy-9,11,22,23-tetrabromo-ergostene, $\Delta^7$-3-acyloxy-9,11,22,23-tetrahalo-stigmastene, $\Delta^7$-3-acetoxy-9,11,22,23-tetrabromo-stigmastene, $\Delta^7$-9,11-dihalo-dehydrotigogenin acylate, $\Delta^7$-9,11-dibromo-dehydrotigogenin acetate, as well as $\Delta^{9(11)}$-7,8-dihalo-allo-cyclopentanopolyhydrophenanthrene compounds, as for example, $\Delta^{9(11)}$-3-acyloxy-7,8,22,23-tetrahalo-ergostene, $\Delta^{9(11)}$-3-acetoxy-7,8,22,23-tetrabromo-ergostene, $\Delta^{9(11)}$-3-acyloxy-7,8,22,23-tetrahalo-stigmastene, $\Delta^{9(11)}$-3-acetoxy-7,8,22,23-tetrabromo-stigmastene, $\Delta^{9(11)}$-7,11-dihalo-dehydrotigogenin acylate, $\Delta^{9(11)}$-7,11-dibromo-dehydrotigogenin acetate, and the like. These $\Delta^7$-9,11-dihalo-allo-cyclopentanopolyhydrophenanthrene compounds and $\Delta^{9(11)}$-7,8-dihalo-allo-cyclopentanopolyhydrophenanthrene compounds ordinarily rearrange, however, due to allylic migration of the tertiary bromide attached to the C–9 carbon atom, to produce the corresponding $\Delta^8$-7,11-dihalo-allo-cyclopentanopolyhydrophenanthrene compounds.

As set forth hereinabove, we ordinarily employ, per mole of $\Delta^7$-allo-cylcopentanopolyhydrophenanthrene compound, at least two moles of halogen, or at least two moles of N-haloamide in conjunction with a trace amount of halogen or hydrogen halide, supplemented, in either case, by an additional mole of halogen where the $\Delta^8$-allo-cyclopentanopolyhydrophenanthrene compound contains an unsaturated C–17 side chain. We have found that, when lower molar ratios of bromine, chlorine, N-bromacetamide, N-chloracetamide, N-bromsuccinimide or N-chlorsuccinimide are employed, the product of the halogenation reaction is a partially halogenated intermediate, which, upon dehalogenation, is converted to the desired $\Delta^{7,9(11)}$-allo-cyclopentanopolyhydrophenanthrene compound in poor yield and in impure form. Our procedure, however, utilizing the specified proportion of halogenating agent, ordinarily results in the obtainment of the desired $\Delta^{7,9(11)}$-allo-cyclopentanopolyhydrophenanthrene compound in a yield approaching 90% of that theoretically obtainable.

Dehalogenation of the polybrominated or polychlorinated allo-cyclopentanopolyhydrophenanthrene compound is ordinarily accomplished by treating said compound with an excess of a dehalogenating agent as, for example, an alkali metal iodide such as sodium iodide or potassium iodide, metallic zinc, zinc and acetic acid, zinc and a lower alkanol such as ethanol, methanol or isopropanol, metallic magnesium, chromous chloride, alkaline earth metal iodides such as calcium iodide, quaternary ammonium iodides such as tetramethyl-ammonium iodide, methyl-trimethyl-ammonium iodide, phenyl-trimethyl-ammonium iodide, and the like.

We ordinarily carry out the dehalogenation reaction directly on the chlorination or bromination reaction mixture itself without isolation of the intermediate polychlorinated or polybrominated steroid compound. Moreover, we prefer to start the dehalogenation reaction at the low temperature used for the bromination or chlorination reaction (i. e. at a temperature below about −20° C. where carbon tetrachloride is used as the solvent for the halogenation reaction, or at a temperature below about −30° C. where the solvent used is chloroform); when the halogenation reaction mixture is allowed to warm to a temperature above those specified prior to the start of the dehalogenation reaction, considerable decomposition of the polyhalogenated intermediate occurs, and the yield of $\Delta^{7,9(11)}$-allo-cyclopentanopolyhydrophenanthrene compound is lowered accordingly. Although decomposition of the polyhalogenated intermediate occurs at about −20 to −25° C. when chloroform is used as the reaction solvent, the stability of this polyhalogenated intermediate varies in different solvents. As set forth above, the critical temperature for initiating dehalogenation is somewhat higher in solvents such as carbon tetrachloride, and, in fact, utilizing carbon tetrachloride as the solvent, it has been found that it is possible to conduct the dehalogenation reaction at temperatures within the range of −10 to −20° C. without appreciable decomposition of the polyhalogenated intermediate.

After adding the dehalogenating agent to the chlorination or bromination reaction mixture, the resulting mixture is allowed to warm slowly, and the dehalogenation reaction is ordinarily completed at room temperature. Under these conditions, the dehalogenation reaction is usually substantially complete after a total dehalogenation reaction period of approximately four hours.

Although the dehalogenation reaction is ordinarily carried out directly on the cold bromination or chlorination mixture without isolating the polyhalogenated intermediate, the polybrominated or polychlorinated steroid compound can be isolated, if desired, from the halogenation solution. This isolation is ordinarily achieved by adding to the halogenation solution an oxygenated organic solvent miscible with said solution as, for example, a lower dialkyl ketone such as acetone, or a lower alkanol such as methanol or ethanol, whereupon the polybrominated or polychlorinated steroid compound precipitates and is recovered by filtration or centrifugation. This isolation procedure is ordinarily conducted at temperatures below about −10° C. due to the instability of the halogenated intermediate in the usual reaction solvent, chloroform. Where carbon tetrachloride is used as the halogenating solvent, however, the dilution of the reaction mixture with the alkanol or ketone can be conducted at higher temperatures, even up to room temperature, without appreciable decomposition of the polyhalogenated steroid compound. The isolated, dried, polybrominated and polychlorinated steroids obtained in accordance with our halogenation procedure are moderately stable at ordinary temperatures, and their physical properties are thus readily ascertainable.

The polybrominated or polychlorinated steroid compounds (such as our preferred $\Delta^8$-7,11-dihalo-allo-cyclopentanopolyhydrophenanthrene compounds) isolated as set forth hereinabove, can then be reacted with a dehalogenation agent utilizing substantially the same reaction conditions as those employed in the direct dehalogenation of the reaction solution. This modification of our process is ordinarily conducted in a halogenated hydrcarbon solvent such as carbon tetrachloride, chloroform, a dialkyl ether such as diethyl ether, and the like. The preferred temperature for the dehalogenation reaction in this instance likewise depends on the particular solvent employed in the reaction.

We prefer to carry out the dehalogenation reaction utilizing a large excess of dehalogenating agent. The extent of dehalogenation is dependent upon the dehalogenating agent employed. When bivalent metals such as metallic zinc, metallic magnesium, and the like, are used in conjunction with acetic acid or a lower alkanol, the halogen is ordinarily completely removed from the polyhalogenated steroid compound. Thus, when zinc and acetic acid are reacted with a $\Delta^8$-7,11-dihalo-allo-cyclopentanopolyhydrophenanthrene compound having one or more keto substituents attached to the C–17 side chain, such as $\Delta^8$-3-acyloxy-7,11,22,23-tetrahaloergostene, $\Delta^8$-3-acyloxy-7,11,22,23-tetrahalo-stigmastene, a $\Delta^8$-7,11-dihalo-dehydrosapogenin (e. g. a $\Delta^8$-7,11-dihalo-dehydrotigogenin) containing a halo substituent in the C–17 side chain, 3-acyloxy-7,8,9,11,22,23-hexahaloergostane, 3 - acyloxy-7,8,9,11,22,23-hexahalostigmastane, a 7,8,9,11-tetrahalo-sapogenin (e. g. a 7,8,9,11-tetrahalo-tigogenin) containing a halo substituent in the C–17 side chain, the resulting product is the completely dehalogenated, corresponding $\Delta^{7,9(11)}$ - allo - cyclopentanopolyhydrophenanthrene compound as, for example, a $\Delta^{7,9(11),22}$-ergostatriene compound such as $\Delta^{7,9(11),22}$ - 3 - acyloxy - ergostatriene, $\Delta^{7,9(11),22}$-3-acetoxy - ergostatriene, a $\Delta^{7,9(11),22}$ - stigmastatriene compound such as $\Delta^{7,9(11),22}$-3-acyloxy-stigmastatriene, $\Delta^{7,9(11),22}$-3-acetoxy-stigmastatriene, a $\Delta^{7,9(11)}$-bisdehydrosapogenin compound such as a $\Delta^{7,9(11)}$-bisdehydrotigogenin compound, $\Delta^{7,9(11)}$-bisdehydrotigogenin acylate, $\Delta^{7,9(11)}$-bisdehydrotigogenin acetate, and the like.

When the bromination or chlorination reaction product or the isolated polybrominated or polychlorinated steroid is reacted with a less active dehalogenating agent as, for example, an alkali metal iodide, an alkaline earth metal iodide, and the like, the halogen substituents are removed from the B and C rings of the steroid nucleus with the formation of the corresponding $\Delta^{7,9(11)}$-steroid-diene but the bromine attached to the C–17 side chain is not attacked. In accordance with this mild dehalogenation procedure, a $\Delta^8$-7,11 - dihalo - allo - cyclopentanopolyhydrophenanthrene compound containing one or more halogen substituents attached to the C–17 side chain as, for example, a $\Delta^8$-7,11,22,23-tetrahalo-ergostene compound such as $\Delta^8$-3 - acetoxy - 7,11,22,23 - tetrabromo - ergostene, a $\Delta^8$-7,11,22,23-tetrahalo-stigmastene compound such as $\Delta^8$-3-acetoxy-7,11,22,23-tetrabromo-stigmastene, a $\Delta^8$-7,11-dihalo-dehydrotigogenin compound containing a halogen substituent attached to the C–17 side chain such as 7,11,23-tribromo-tigogenin acetate, a 7,8,9,11-tetrahalo-allo-cyclopentanopolyhydrophenanthrene compound containing one or more halogen substituents attached to the C–17 side chain, as, for example, a 7,8,9,11,22,23-hexahalo-ergostane compound such as 3-acetoxy-7,8,9,11,22,23-hexabromo-ergostane, a 7,8,9,11,22,23-hexahalo-stigmastane compound such as 3-acetoxy-7,8,9,11,22,23-hexabromo-stigmastane, 7,8,9,11-tetrahalo-tigogenin compound containing a halo substituent in the C–17 side chain such as 7,8,9,11,23-pentabromo-tigogenin acetate, and the like, is reacted with a less active dehalogenating agent such as an alkali metal iodide thereby forming the corresponding $\Delta^{7,9(11)}$ - allo - cyclopentanopolyhydrophenanthrene compound wherein the halo substituent attached to the C–17 side chain is unaffected as, for example, a $\Delta^{7,9(11)}$-22,23-dihalo-ergostadiene compound such as $\Delta^{7,9(11)}$-3-acyloxy-22,23 - dihalo-ergostadiene, $\Delta^{7,9(11)}$ - 3-acetoxy-22,23-dibromo-ergostadiene, $\Delta^{7,9(11)}$ - 3 - acetoxy-22,23-dichloro-ergostadiene, a $\Delta^{7,9(11)}$-22,23-dihalo-stigmastadiene compound such as $\Delta^{7,9(11)}$-3-acyloxy-22,23-dihalo-stigmastadiene, $\Delta^{7,9(11)}$-3-acetoxy-7,11-dibromo-stigmastadiene, $\Delta^{7,9(11)}$ - 3 - acetoxy-7,11-dichloro-stigmastadiene, a $\Delta^{7,9(11)}$-bisdehydrotigogenin compound containing a halo substituent attached to the C–17 side chain such as $\Delta^{7,9(11)}$-23-halo-bisdehydrotigogenin acylate, $\Delta^{7,9(11)}$-23-bromo-bisdehydrotigogenin acetate, and the like.

These $\Delta^{7,9(11)}$-22,23-dihalo-ergostadiene and $\Delta^{7,9(11)}$-22,23-dihalo-stigmastadiene compounds such as $\Delta^{7,9(11)}$-3 - acyloxy - 22,23 - dihalo - ergostadiene, $\Delta^{7,9(11)}$ - 3-acetoxy - 22,23 - dibromo - ergostadiene, $\Delta^{7,9(11)}$ - 3 - acetoxy-22,23-dichloro-ergostadiene, $\Delta^{7,9(11)}$-3-acyloxy-22,23-dihalo-stigmastadiene, $\Delta^{7,9(11)}$-3-acetoxy-22,23-dichloro-stigmastadiene, $\Delta^{7,9(11)}$-3-acetoxy-22,23-dibromo-stigmastadiene, and the like, obtained by the foregoing partial dehalogenation reaction utilizing alkali metal iodides, are particularly advantageous (as compared with the corresponding $\Delta^{7,9(11),22}$-ergostatriene and $\Delta^{7,9(11),22}$-stigmastatriene compounds) as intermediates for the synthesis of adrenal cortical hormones. These $\Delta^{7,9(11)}$-22,23-dihalo-ergostadiene and $\Delta^{7,9(11)}$-22,23-dihalo-stigmadiene compounds possess a saturated C–17 side chain; subsequent oxidation of the nuclear $\Delta^{7,9(11)}$-diene system can therefore be carried out without attendant oxidation of the C–17 side chain.

It is ordinarily preferred, however, where the starting material is a $\Delta^7$-allo-cyclopentanopolyhydrophenanthrene compound containing a saturated C–17 side chain as, for example a $\Delta^7$-dehydrosapogenin compound such as $\Delta^7$-dehydrotigogenin acylate, $\Delta^7$-dehydrotigogenin acetate, $\Delta^7$-dehydrotigogenin, and the like, to conduct the bromination or chlorination reaction under conditions such as those set forth hereinabove whereby bromination of the C–17 side chain is avoided, thereby forming, as the polyhalogenated steroid intermediate, the corresponding $\Delta^8$-7,11-dihalo-dehydrotigogenin compound wherein the C–17 side chain does not contain any halo substituent, such as $\Delta^8$-7,11-dihalo-dehydrotigogenin-acylate, $\Delta^8$-7,11-dibromo-dehydrotigogenin acetate, $\Delta^8$-7,11-dichloro-dehydrotigogenin acetate, and the like. We prefer to carry out the halogenation of these $\Delta^7$-dehydrosapogenins so as to avoid bromination or chlorination of the side chain because the subsequent dehalogenation of such polyhalogenated sapogenins is more difficult to effect where the C–17 side chain contains a halogen substituent. This difficulty in dehalogenating polyhalogenated sapogenins, containing a halogenated C–17 side chain, is due to the fact that the reaction readily results in dehydrohalogenation of the side chain with the formation of unwanted by-products. Where it is desired to dehalogenate a $\Delta^8$-7,11-dihalosapogenin compound such as a $\Delta^8$-7,11-dihalo-tigogenin containing a halo substituent attached to the C–17 side chain, it is ordinarily preferred to react said $\Delta^8$-7,11-dihalo-sapogenin compound with acetic acid and zinc at reflux temperature whereby the removal of the halo substituent attached to the C–17 side chain is achieved by dehalogenation rather than by a dehydrohalogenation reaction.

Although the $\Delta^7$-allo-cyclopentanopolyhydrophenanthrene compounds having a hydroxyl substituent attached to the C–3 carbon atom such as $\Delta^{7,22}$-3-hydroxy-ergostadiene, $\Delta^{7,22}$-3-hydroxy-stigmastadiene, and $\Delta^7$-dehydrotigogenin, are ordinarily reacted with an acylating agent to convert the 3-hydroxy substituent to an acyloxy radical prior to the halogenation or bromination reaction, our halogenation and dehalogenation procedures can be conducted, if desired, utilizing compounds such as α-dihydroergosterol, 7-dehydrotigogenin, and the like, which possess free hydroxyl groups.

In a preferred embodiment of our halogenation procedure, the bromination or chlorination reaction is conducted in a liquid medium comprising a compound which can be characterized as a "Lewis base" in accordance with G. N. Lewis' definition of acids and bases as set forth on pages 80-81 of the text "Advanced Organic Chemistry" by G. B. Wheland (Wiley & Sons, 2nd edition, 1949), as for example, a primary, secondary or tertiary alkanol such as ethanol, methanol, isopropanol, n-propanol, isobutanol, secondary butanol, n-butanol, tertiary butanol, a glycol, such as ethylene glycol, propylene glycol, a trihydric alcohol, such as glycerol, a dialkyl ether such as diethyl ether, dibutyl ether, a cyclic ether such as dioxane, ethylene oxide, and the like. These "Lewis bases" which can also be referred to by the expression "proton acceptors" can be further characterized as being substantially inert to halogenation and as being non-reactive with nuclear bromo or halo radicals attached to the B and C rings of $\Delta^8$-allo-cyclopentanopolyhydrophenanthrene compounds. When our chlorination or bromination procedure is conducted in a halogenated hydrocarbon solvent, such as chloroform or carbon tetrachloride, containing a "Lewis base" having the further characteristics set forth hereinabove there results a substantial improvement in yield and quality of the polybrominated or polychlorinated steroid intermediate.

Moreover, where the halogenation or the $\Delta^7$-allo-cyclopentanopolyhydrophenanthrene compound is conducted in a halogenated hydrocarbon solvent, such as chloroform or carbon tetrachloride, we can obtain a substantial improvement in yield and quality of the final dehalogenated product, the $\Delta^{7,9(11)}$-allo-cyclopentanopolyhydrophenanthrene compound, by adding to the halogenation mixture, prior to the dehalogenation reaction, a lower alkanol, such as methanol, ethanol, a dialkyl ether, such as diethyl ether, dibutyl ether, and the like.

The following examples illustrate methods of carrying out the present invention, but it is to be understood that these examples are given for purposes of illustration and not of limitation.

*Example 1*

Two and ninety-six hundredths grams (0.0067 mole) of $\Delta^{7,22}$-3-acetoxy-ergostadiene were dissolved in 150 ml. of dry chloroform, and the solution was cooled to a temperature of approximately $-60°$ C. to $-70°$ C. To this solution was added, in portions of 5 and 10 ml. each and over a period of twenty-four hours, a solution containing 4.28 g. (0.0268 mole) of bromine in 206 ml. of dry chloroform, while maintaining the temperature of the reaction solution within the range of $-60°$ C. to $-70°$ C. After the addition of one molecular equivalent (based on the $\Delta^{7,22}$-3-acetoxy-ergostadiene) of bromine, the further small additions of bromine were completely decolorized in two minutes; after the addition of two molecular equivalents of bromine, decolorization required about four minutes; after the addition of three molecular equivalents of bromine, the bromine solution was almost completely decolorized after twenty-five minutes; after the addition of a total of 3.4 molecular equivalents, a dark yellow color persisted after four hours; after the addition of 4.0 molecular equivalents of bromine, a light yellow color remained even after the reaction solution had stood at a temperature of $-70°$ C. for a period of fifteen hours.

The bromination solution was maintained at a temperature of about $-60°$ C. to $-70°$ C. while adding thereto, with stirring, 100 ml. of glacial acetic acid and about 10.0 g. (0.153 mole) of zinc dust. The resulting mixture was stirred for a period of three hours while allowing the temperature to rise from $-60°$ C. to $+33°$ C. The reaction mixture was filtered, and the filtered reaction solution was washed with water, thereby extracting acetic acid from the chloroform reaction solution. The washed chloroform reaction solution was then evaporated to dryness under reduced pressure, and the residual material was recrystallized from ethyl acetate to give substantially pure $\Delta^{7,9(11),22}$-3-acetoxy-ergostatriene (ergosterol D-acetate); M. P. 169–178° C.; $[\alpha]_D^{25°\,C.}=+29°$ (chloroform); $\lambda$ max.=2430 A., E%=380.

*Example 2*

Two grams (0.00454 mole) of $\Delta^{7,22}$-3-acetoxy-ergostadiene were dissolved in 50 ml. of dry chloroform, and the solution was cooled to approximately $-60°$ C. Two and eighteen-hundredths grams (0.0136 mole) of bromine were dissolved in 50 ml. of dry chloroform and this solution, also, was cooled to approximately $-60°$ C. These two solutions were mixed together and maintained at a temperature within the range of $-60°$ C. to $-70°$ C. for a period of about ten minutes, at the end of which time the reaction solution was completely decolorized. To this bromination solution was added 22.5 ml. of glacial acetic acid followed by 4.63 g. of zinc dust while maintaining the reaction mixture at a temperature of $-60°$ C. to $-70°$ C. The resulting mixture was allowed to stand for a period of about thirty minutes, during which time the temperature was allowed to rise from $-60°$ C. to approximately $+30°$ C. The reaction mixture was filtered, and the filtered solution was washed with three portions of water. The washed chloroform reaction solution was subjected to ultra-violet absorption spectrum analysis and found to contain an amount of $\Delta^{7,9(11),22}$-3-acetoxy-ergostatriene (ergosterol D-acetate) equivalent to approximately 90% of that theoretically obtainable; E%=333, $\lambda$ max.=2430 A.

*Example 3*

Thirty grams (0.068 mole) of $\Delta^{7,22}$-3-acetoxy-ergostadiene was dissolved in 750 ml. of dry chloroform, and the solution was cooled to a temperature of about $-60°$ C. to $-65°$ C. To this solution was added, dropwise with stirring over a period of one hour, a solution containing 33.5 g. (0.21 mole) of bromine in 750 ml. of dry chloroform; during the addition of the bromine, the temperature of the reaction solution was maintained within the range of $-60°$ C. to $-70°$ C., and the reaction solution was stirred at that temperature for an additional period of one and one-half hours.

A 50 ml. aliquot of the cold reaction solution was added to a cold (temperature $-60°$ C. to $-70°$ C.) solution containing 6.2 g. (0.041 mole) of sodium iodide dissolved in 150 ml. of absolute ethanol. The cherry-red gel which formed was maintained at a temperature of $-60°$ C. to $-70°$ C. for a period of about one hour and was then allowed to warm to room temperature. The resulting chloroform-ethanol reaction solution was washed with a dilute aqueous solution of sodium sulfite, and then with water. Ultraviolet absorption spectrum analysis of the washed chloroform solution showed that the yield of $\Delta^{7,9(11)}$-steroid diene was approximately 93% of that theoretically obtainable.

A portion of the washed, sodium iodide-treated, chloroform reaction solution which contained initially 0.89 g. of $\Delta^{7,22}$-3-acetoxy-ergostadiene starting material, was evaporated to dryness in vacuo to give 1.18 g. of $\Delta^{7,9(11)}$-3-acetoxy-22,23-dibromoergostadiene which was obtained in the form of yellow crystals. This material was washed with methanol and recrystallized, first from acetone and then from isopropanol, to give substantially pure $\Delta^{7,9(11)}$-3-acetoxy-22,23-dibromoergostadiene which was obtained in the form of colorless needles; M. P. 214–221° C. (dec.); $[\alpha]_D^{25°\,C.}=+23.7°$ (chloroform); $\lambda$ max.=2350 A., 2425 A., 2510 A., E%=256, 287, 188.

*Analysis.*—Calcd. for $C_{30}H_{46}O_2Br_2$: C, 60.19; H, 7.75; Br, 26.70. Found: C, 60.43; H, 7.33; Br, 26.10.

Example 4

Thirty grams (0.068 mole) of $\Delta^{7,22}$-3-acetoxy-ergostadiene was dissolved in 750 ml. of dry chloroform, and the solution was cooled to a temperature of about $-60°$ C. to $-65°$ C. To this solution was added, dropwise with stirring over a period of one hour, a solution containing 33.5 g. (0.21 mole) of bromine in 750 ml. of dry chloroform; during the addition of the bromine, the temperature of the reaction solution was maintained within the range of $-60°$ to $-70°$ C., and the reaction solution was stirred at that temperature for an additional period of one and one-half hours.

A small portion of this bromination solution was warmed to room temperature, and to the solution was added an excess of zinc and acetic acid. The resulting mixture was filtered, and the filtered solution was washed with water, thereby extracting the acetic acid therefrom. The washed chloroform solution was evaporated to dryness in vacuo, and the residual material was washed with a small amount of methanol to give $\Delta^{7,9(11),22}$-3-acetoxy-ergostatriene.

Example 5

Four grams (0.0088 mole) of $\Delta^7$-dehydrotigogenin acetate was dissolved in 100 ml. of chloroform and to this solution was added, over a period of thirty minutes, while maintaining the temperature of the solution within the range of about $-55°$ to $-60°$ C., a solution of 4.3 g. (0.0269 mole) of bromine in 110 ml. of chloroform. The resulting mixture was stirred for an additional thirty minute period at a temperature of $-55°$ to $-60°$ C.

To the cold solution was then added 32 g. of glacial acetic acid and 11.4 g. of zinc dust, and the resulting mixture was stirred while warming to room temperature. The reaction mixture was filtered thereby removing residual zinc, and the filtered solution was washed with two 100 ml. portions of water, and dried over anhydrous sodium sulfate. The solvent was evaporated from the dry chloroform solution in vacuo and the residual material was triturated with ethanol. The crystalline slurry was filtered, and the crystalline material was washed with ethanol and dried to give $\Delta^{7,9(11)}$-bisdehydrotigogenin acetate containing a bromine substituent in the side chain; M. P. 180–184° C. (dec.); $\lambda$ max. 2500 A., 2430 A., 2350 A., E% 207, 321, 384.

Example 6

Two grams of $\Delta^{7,9(11)}$-bisdehydrotigogenin acetate containing a bromine substituent in the side chain (prepared as described in Example 5 hereinabove and having an M. P. of 180–184° C.) were added to 30 ml. of glacial acetic acid. Six grams of zinc dust were added and the resulting mixture was heated under reflux for a period of about one and one-half hours. Sixty milliliters of benzene were added to the reaction mixture, and the mixture was filtered. The filtered solution was washed with three 100 ml.-portions of water, dried over anhydrous soduim sulfate, and the solvents evaporated therefrom in vacuo. The residual material was triturated with 15 ml. of ethanol, and the mixture was heated at the boiling point of ethanol for a few minutes, and then cooled. The crystalline slurry was filtered, and the crystalline material was recrystallized from ethanol to give substantially pure $\Delta^{7,9(11)}$-bisdehydrotigogenin actate; M. P. 214–218° C.

Example 7

Two grams (0.0044 mole) of $\Delta^7$-dehydrotigogenin acetate were dissolved in 50 ml. of chloroform and to this solution was added, over a fifteen-minute period while maintaining the temperature of the solution within the range of $-55$ to $-60°$ C., a solution of 1.45 g. (0.009 mole) of bromine in 50 ml. of chloroform. The mixture was stirred at a temperature of $-55$ to $-60°$ C. for an additional period of fifteen minutes, 15 ml. of glacial acetic acid and 5 g. of zinc dust were added to the cold reaction mixture, and the resulting mixture was allowed to warm slowly, with stirring, to room temperature. The mixture was filtered and the filtered chloroform solution was washed with water, dried over anhydrous sodium sulfate, and the solvent evaporated therefrom in vacuo. The residual solid material was triturated with hexane, the crystalline slurry was filtered, and the crystalline product was recrystallized first from ethyl acetate and then from chloroform-ethanol to give substantially pure $\Delta^{7,9(11)}$-bisdehydrotigogenin acetate; M. P. 218–221° C.

Example 8

Thirty grams (0.068 mole) of $\Delta^{7,22}$-3-acetoxy-ergostadiene were dissolved in 750 ml. of dry chloroform, and the solution was cooled to approximately $-60$ to $-65°$ C. To this solution was added, dropwise, with stirring and over a period of one hour, a solution containing 33.5 g. (0.21 mole) of bromine in 750 ml. of dry chloroform. The resulting solution was stirred for an additional period of one and one-half hours while maintaining the temperature at $-60$ to $-65°$ C.

A 50 ml.-aliquot of the reaction solution, which contained the equivalent of 1.19 g. (0.00252 mole) of the $\Delta^{7,22}$-3-acetoxy-ergostadiene starting material, was added to an aqueous acetone solution containing 5 ml. of water and 145 ml. of acetone which had been previously cooled to a temperature of approximately $-50°$ C. The resulting solution was maintained at a temperature of $-50°$ C. for a period of about one hour during which time a heavy precipitate formed. The resulting slurry was warmed to room temperature, filtered, and the solid product was dried to give $\Delta^8$-3-acetoxy-7,11,22,23-tetrabromoergostene; M. P. 126–127° C.. This material gave a green solution when dissolved in chloroform.

A second 50 ml.-aliquot of the reaction solution was added to 120 ml. of methanol which had been previously cooled to a temperature of $-50$ to $-60°$ C., and the resulting solution was maintained at that temperature for a period of about one hour during which time a heavy curd-like precipitate of $\Delta^8$-3-acetoxy-7,11,22,23-tetrabromoergostene formed; when the resulting slurry was allowed to warm to room temperature, the $\Delta^8$-3-acetoxy-7,11,22,23-tetrabromoergostene redissolved to give an orange-colored solution.

Example 9

Ten grams (0.0227 mole) of $\Delta^{7,22}$-3-acetoxy-ergostadiene were dissolved in 150 ml. of dry chloroform, and the solution was cooled to a temperature of about $-60°$ C. A solution containing 10.9 g. (0.0681 mole) of bromine in 100 ml. of dry chloroform was also cooled to a temperature of $-60°$ C., and the two solutions were mixed together. The mixture was stirred at a temperture of about $-50°$ C. for a period of about thirty minutes, and the reaction solution was added to a cold aqueous acetone solution containing 100 ml. of water and 1400 ml. of acetone. The solid material which precipitated was recovered by filtration, suspended in methanol to dissolve the ice present, and the insoluble crystalline material was recovered by filtration and dried to give $\Delta^8$-3-acetoxy-7,11,22,23-tetrabromoergostene; M. P. 123–124° C. (dec.); $[\alpha]_D^{25°}$ C. $= +224°$ (dioxane).

*Analysis.*—Calcd. for $C_{30}H_{46}O_2Br_4$: C, 47.51; H, 6.12; Br, 42.16. Found: C, 48.01; H, 6.30; Br, 41.75.

Example 10

Ten grams (0.0227 mole) of $\Delta^{7,22}$-3-acetoxy-ergostadiene were dissolved in 150 ml. of dry chloroform and the solution was cooled to a temperature of about $-60°$ C. A solution containing 10.9 g. (0.0681 mole) of bromine in 100 ml. of chloroform was also cooled to a temperature of $-60°$ C., and the two solutions were mixed together. The mixture was stirred at a temperature of −60° C. for a period of about thirty minutes, and the cold reaction solution was added to one liter of cold methanol. The crystalline material which precipitated was recovered by filtration, washed twice with methanol and dried to give substantially pure $\Delta^8$-3-acetoxy-7,11,22,23-tetrabromoergostene which was obtained in the form of white microcrystals; M. P. 125–127° C. (dec.); $[\alpha]_D^{25°C.}=+214$ (dioxane). When $\Delta^{7,9(11),22}$-3-acetoxy-ergostatriene was reacted with bromine in chloroform at a temperature of approximately −60° C., and the brominated product isolated substantially in accordance with the foregoing procedure there was obtained $\Delta^8$-3-acetoxy-7,11,22,23-tetrabromo-ergostene identical with that obtained above by bromination of $\Delta^{7,22}$-3-acetoxy-ergostatriene.

Example 11

Four grams (0.00528 mole) of $\Delta^8$-3-acetoxy-7,11,22,23-tetrabromoergostene, prepared in accordance with the procedure described in Example 10 hereinabove, was dissolved in 200 ml. of cold chloroform (temperature = −60° C.), and this solution was mixed with a cold solution (temperature = −60° C.) containing 15 g. (0.10 mole) of sodium iodide in 200 ml. of absolute ethanol. The mixture was allowed to warm to room temperature. The ethanolic-chloroform reaction solution was washed with aqueous sodium iodide solution, then with aqueous sodium bicarbonate solution, and finally with water. The washed chloroform solution was evaporated to dryness in vacuo. To the residual material was added methanol, and the resulting solution was evaporated to small volume in vacuo, and the concentrated solution was cooled. The crystalline material which precipitated was recovered by filtration and dried to give $\Delta^{7,9(11)}$-3-acetoxy-22,23-dibromoergostadiene which was obtained in the form of white microcrystals; M. P. 215–225° C.; $[\alpha]_D^{25°C.}=+29°$ (chloroform); $\lambda$ max. 2420 A., E% 290.

Example 12

One gram (0.00227 mole) of $\Delta^{7,22}$-3-acetoxy-ergostadiene was dissolved in 25 ml. of carbon tetrachloride, and the solution was cooled to a temperature of −20° C. A solution containing 1.09 g. (0.00681 mole) of bromine in 25 ml. of carbon tetrachloride was also cooled to a temperature of −20° C. The two solutions were mixed and maintained at a temperature within the range of −15° C. to −20° C. for a period of about forty-five minutes. Two hundred milliliters of cold methanol (temperature approximately −65° C.) was added to this reaction solution, and the crystalline material which precipitated was recovered by filtration, washed with cold methanol, and dried to give $\Delta^8$-3-acetoxy-7,11,22,23-tetrabromoergostene which was obtained in the form of white microcrystals; M. P. 123–125° C.; $[\alpha]_D^{25°C.}=+221°$ (dioxane).

Example 13

One-half gram (0.00066 mole) of $\Delta^8$-3-acetoxy-7,11,22,23-tetrabromoergostene was dissolved in 25 ml. of carbon tetrachloride, and the solution was cooled to 0° C. To this solution was added a cold solution (temperature = 0° C.) containing 2.0 g. (0.0134 mole) of sodium iodide in 25 ml. of absolute ethanol, and the mixture was allowed to warm to room temperature. The ethanolic-carbon tetrachloride solution was washed with aqueous sodium thiosulfate solution, then with aqueous sodium bicarbonate solution, and finally with water. The washed carbon tetrachloride solution was evaporated to dryness in vacuo. To the residual material was added methanol, and the resulting solution was evaporated in vacuo to small volume. The concentrated methanolic solution was cooled and the crystalline material which precipitated was recovered and dried to give $\Delta^{7,9(11)}$-3-acetoxy-22,23-dibromoergostadiene which was obtained in the form of white micro-crystals; M. P. 221–224° C.; $[\alpha]_D^{25°C.}=+25°$ (chloroform); $\lambda$ max. 2420 A., E% 297.

Example 14

Four grams (0.00528 mole) of $\Delta^8$-3-acetoxy-7,11,22,23-tetrabromoergostene (which was prepared in accordance with the procedure described in Example 10 hereinabove) was dissolved in a cold solution (temperature = −60° C.) containing 200 ml. of dry chloroform and 10 ml. of glacial acetic acid. To this solution was added 3.0 g. of zinc dust, and the mixture was stirred for a period of thirty minutes while maintaining the temperature at about −60° C. The mixture was then allowed to warm to room temperature, the reaction mixture was filtered, and the filtered chloroform solution was washed with aqueous sodium bicarbonate solution, and then with water. The washed chloroform solution was evaporated to dryness in vacuo, and the residual material was dissolved in methanol. The methanolic solution was evaporated in vacuo to small volume, the concentrated solution was cooled, and the crystalline material which precipitated was recovered by filtration and dried to give crude $\Delta^{7,9(11),22}$-3-acetoxy-ergostatriene; M. P. 160–170° C.; $[\alpha]_D^{25°C.}=+24°$ (chloroform).

Example 15

Eight and eight-tenths grams (0.02 mole) of $\Delta^{7,22}$-3-acetoxy-ergostadiene and 7.1 g. (0.04 mole) of N-bromosuccinimide were dissolved in 200 ml. of chloroform, the solution was cooled to a temperature of about −50° C., and this solution was mixed with a cold solution (temperature = about −50° C.) containing 2.2 g. (0.02 mole) of bromine in 50 ml. of chloroform. The resulting solution was allowed to stand at a temperature within the range of about −50 to −60° C. for a period of approximately thirty minutes.

An aliquot of this reaction solution was added to cold methanol (temperature approximately −50° C.), and the crystalline material which precipitated was recovered by filtration and dried to give $\Delta^8$-3-acetoxy-7,11,22,23-tetrabromoergostene, which was obtained in the form of white micro-crystals; M. P. 124–126° C.; this compound gave a green color in chloroform, and liberated iodine from an ethanolic sodium iodide solution.

A second aliquot of the reaction solution was mixed with a cold solution (temperature = −60° C.) containing 30.0 g. (0.2 mole) of sodium iodide in 200 ml. of cold absolute ethanol, and the resulting solution was allowed to warm to a temperature of about +10° C. The ethanolic-chloroform reaction solution was washed first with an aqueous solution of sodium sulfite, then with an aqueous solution of sodium bicarbonate, and finally with water. The washed chloroform solution was evaporated to dryness in vacuo, methanol was added to the residual material, and the methanolic solution was evaporated in vacuo to small volume. The concentrated methanolic solution was cooled, and the crystalline material which separated was recovered by filtration and dried to give $\Delta^{7,9(11)}$-3-acetoxy-22,23-dibromoergostadiene, which was obtained as a light-yellow solid; M. P. 224–226° C.

Example 16

A solution of 25.0 g. (0.0567 mole) of $\Delta^{7,22}$-3-acetoxy-ergostadiene in 625 ml. of dry chloroform was cooled to a temperature of about −60° C., and to this solution was added, with stirring over a period of about fifteen minutes while maintaining the temperature of the mixture at about −60° C., a cold solution containing 28.1 g. (0.175 mole) of bromine in 625 ml. of dry chloroform. The resulting solution was stirred for an additional fifteen-minute period, and the reaction solution was cooled to about −60° C. To this cooled reaction solution was added a cold solution (temperature approximately −60° C.) containing approximately 125 ml. of methanol and 140 ml. of glacial acetic acid, followed by 35 g. of zinc dust. The mixture was stirred, while allowing the temperature to rise gradually. When the temperature reached 7° C., 17 g. of zinc dust was added to the mixture; when the temperature reached +25° C. an additional 6 g. of zinc dust was added. The stirring was continued while warming the mixture to a final temperature of +35° C. The reaction mixture was cooled to −30° C., filtered, and the insoluble material was washed with chloroform. The filtered chloroform solution and washings were combined, and the resulting chloroform solution was washed with water, then with aqueous sodium bicarbonate solution, and finally with water. The washed chloroform solution was evaporated to dryness in vacuo, the residual material was disssolved in methanol, and the methanol solution was evaporated to dryness in vacuo. The residual material was digested in methanol under reflux at atmospheric pressure for a period of about ten minutes, and the mixture was cooled slowly with stirring to a temperature of about 0° C. The insoluble crystalline material was recovered by filtration and dried to give 20.7 g. of $\Delta^{7,9(11),22}$-3-acetoxyergostatriene; M. P. 168–177° C.; $\lambda$ max. 2425 A., E% 384; $[\alpha]_D^{25°\ C.} = +29.7°$ (chloroform).

*Example 17*

Twenty grams (0.0453 mole) of $\Delta^{7,22}$-3-acetoxy-ergostadiene was dissolved in 125 ml. of dry chloroform, and the solution was cooled to a temperature of about −60° C. This solution was then maintained at that temperature over a period of approximately fifty minutes during which time there was added to the solution, simultaneously with stirring, 25 ml. of methanol, and a solution containing 22.1 g. (0.138 mole) of bromine in 125 ml. of dry chloroform. The resulting solution was stirred at a temperature of approximately −50° C. for an additional period of fifteen minutes. The reaction solution was cooled to a temperature of −65° C., and to this cold reaction solution was added a solution containing 25 ml. of methanol and 60 ml. of glacial acetic acid, followed by 28 g. of zinc dust. The mixture was stirred while allowing the temperature to rise gradually; when the temperature reached +10° C., an additional 14 g. of zinc dust was added; when the temperature reached 25° C. an additional 4 g. of zinc dust was added. The resulting mixture was stirred and allowed to warm to a temperature of +35° C., the mixture was then cooled to a temperature of about −30° C. and filtered. The filtered chloroform reaction solution was washed with water, then with aqueous sodium bicarbonate solution, and finally with water, and the washed chloroform solution was evaporated to dryness in vacuo. The residual material was dissolved in methanol, and the methanolic solution was evaporated to dryness in vacuo. The residual material was digested by heating with methanol under reflux at an atmospheric pressure for a period of ten minutes, and the mixture was cooled slowly, with stirring, to a temperature of about 0° C. The insoluble crystalline material was recovered by filtration and dried to give 15.8 g. of $\Delta^{7,9(11),22}$-3-acetoxy-ergostatriene; M. P. 165–174° C.; $\lambda$ max. 2425 A., E% 334; $[\alpha]_D^{25°\ C.} = +21.2°$ (chloroform).

*Example 18*

Twenty grams (0.0453 mole) of $\Delta^{7,22}$-3-acetoxy-ergostadiene was dissolved in 125 ml. of dry chloroform, and the solution was cooled to a temperature of approximately −60° C. This solution was maintained at a temperature of −60° C. over a period of thirty-five minutes during which time there was added to the solution, simultaneously with stirring, 25 ml. of anhydrous ethyl ether, and a solution containing 22.1 g. (0.138 mole) of bromine in 125 ml. of dry chloroform. The resulting solution was stirred at a temperature of approximately −50° C. for a period of about twenty minutes, the reaction mixture was cooled to a temperature of about −65° C. and debrominated in accordance with the procedure described in Example 17 hereinabove using 46 g. of zinc dust, 25 ml. of methanol and 60 ml. of glacial acetic acid. The debrominated reaction mixture was then treated in accordance with the procedure described in Example 17 to give approximately 16.2 g. of $\Delta^{7,9(11),22}$-3-acetoxy-ergostatriene; M. P. 170–176° C.; $\lambda$ max. 2425 A., E% 389; $[\alpha]_D^{25°\ C.} = +31.1°$ (chloroform).

*Example 19*

Twenty grams (0.0453 mole) of $\Delta^{7,22}$-3-acetoxy-ergostadiene was dissolved in 125 ml. of dry chloroform, and the solution was cooled to a temperature of approximately −60° C. This solution was maintained at a temperature of about −60° C. over a period of approximately fifty minutes during which there was added to the solution, simultaneously with stirring, 25 ml. of dioxane and a solution of 22.1 g. (0.138 mole) of bromine in 125 ml. of dry chloroform. The mixture was stirred at a temperature of approximately −50° C. for an additional period of twenty minutes. The reaction solution was cooled to a temperature of −60° C. and debrominated in accordance with the procedure described in Example 17 hereinabove utilizing 46 g. of zinc dust, 25 ml. of methanol and 60 ml. of glacial acetic acid to give approximately 16.3 g. of $\Delta^{7,9(11),22}$-3-acetoxy-ergostatriene; M. P. 165–175° C.; $\lambda$ max. 2425 A., E% 351; $[\alpha]_D^{25°\ C.} = 24.1°$ (chloroform).

*Example 20*

Twenty grams (0.0453 mole) of $\Delta^{7,22}$-3-acetoxy-ergostadiene and 5.0 g. (0.113 mole) of ethylenedioxide were dissolved in 125 ml. of dry chloroform, and the solution was cooled to a temperature of approximately −60° C. This solution was maintained at a temperature of about −50 to −60° C. over a period of approximately fifty minutes during which time there was added to the solution, with stirring, a solution containing 22.1 g. (0.138 mole) of bromine in 125 ml. of dry chloroform. The mixture was stirred at a temperature of about −50° C. for an additional period of fifteen minutes. The reaction solution was cooled to a temperature of about −60° C. and debrominated in accordance with the procedure set forth in Example 17 hereinabove utilizing 46 g. of zinc dust, 50 ml. of methanol and 60 ml. of glacial acetic acid to give approximately 14.9 g. of $\Delta^{7,9(11),22}$-3-acetoxy-ergostatriene; M. P. 165–173° C.; $\lambda$ max. 2425 A., E% 374; $[\alpha]_D^{25°\ C.} = +27.4°$ (chloroform).

*Example 21*

A mixture of 200 ml. of dry chloroform, 20.0 g. (0.0453 mole) of $\Delta^{7,22}$-3-acetoxy-ergostadiene and 16.4 g. (0.0921 mole) of N-bromosuccinimide was cooled to a temperature of approximately −60° C., and to this mixture was added, with stirring, over a twenty-minute period, while maintaining the temperature of the mixture at approximately −60° C., a solution of 7.26 g. (0.0453 mole) of bromine and 50 ml. of dry chloroform. The resulting mixture was stirred for an additional thirty-five minute period at a temperature of about −50° C., and was then cooled to a temperature of about −60° C. The brominated product was debrominated substantially in accordance with the procedure set forth in Example 17 hereinabove utilizing 46 g. of zinc dust, 60 ml. of glacial acetic acid and 50 ml. of methanol to give approximately 15.8 g. of $\Delta^{7,9(11),22}$-3-acetoxy-ergostatriene; M. P. 168–174° C.; $\lambda$ max. 2425 A., E% 378; $[\alpha]_D^{25°\ C.} = +23.6°$ (chloroform).

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a $\Delta^7$-allocyclopentanopolyhydrophenanthrene compound, selected from the group which consists of $\Delta^{7,22}$-3-hydroxy-ergostadiene, $\Delta^{7,22}$-3-(lower alkanoyloxy)-ergostadiene, $\Delta^7$-dehydrotigogenin and $\Delta^7$-dehydrotigogenin 3-(lower alkanoate), with a halogenating agent selected from the group which consists of chlorinating agents and brominating agents to produce the corresponding polyhalogenated steroid compound, and reacting this compound with a dehalogenating agent to form the corresponding $\Delta^{7,9(11)}$-allocyclopentanopolyhydrophenanthrene compound.

2. The process which comprises reacting a $\Delta^7$-allocyclopentanopolyhydrophenanthrene compound, selected from the group which consists of $\Delta^{7,22}$-3-hydroxy-ergostadiene, $\Delta^{7,22}$-3-(lower alkanoyloxy)-ergostadiene, $\Delta^7$-dehydrotigogenin and $\Delta^7$-dehydrotigogenin 3-(lower alkanoate), with a brominating agent in a liquid medium substantially inert to halogenation and in the presence of a "Lewis base," said "Lewis base" being substantially inert to halogenation and non-reactive with halo radicals attached to the steroid nucleus, thereby forming the corresponding $\Delta^8$-7,11-dibromo-allo-cyclopentanopolyhydrophenanthrene compound, and reacting the latter compound with a dehalogenating agent to produce the corresponding $\Delta^{7,9(11)}$ - allo-cyclopentanopolyhydrophenanthrene compound.

3. The process which comprises reacting a $\Delta^7$-allocyclopentanopolyhydrophenanthrene compound, selected from the group which consists of $\Delta^{7,22}$-3-hydroxy-ergostadiene, $\Delta^{7,22}$-3-(lower alkanoyloxy)-ergostadiene, $\Delta^7$-dehydrotigogenin and $\Delta^7$-dehydrotigogenin 3-(lower alkanoate), with N-bromosuccinimide in the presence of a relatively small amount of bromine thereby forming the corresponding $\Delta^8$-7,11-dibromo-allo-cyclopentanopolyhydrophenanthrene compound, and reacting said $\Delta^8$-7,11-dibromo-allo-cyclopentanopolyhydrophenanthrene compound with a dehalogenating agent comprising zinc and acetic acid to form the corresponding $\Delta^{7,9(11)}$-allo-cyclopentanopolyhydrophenanthrene compound.

4. The process which comprises reacting $\Delta^{7,22}$-3-acetoxy-ergostadiene with bromine to produce $\Delta^8$-3-acetoxy-7,11,22,23-tetrabromo-ergostene, and reacting this compound with a dehalogenating agent comprising zinc and acetic acid to produce $\Delta^{7,9(11),22}$-3-acetoxy-ergostatriene.

5. The process which comprises reacting $\Delta^{7,22}$-3-acetoxy-ergostadiene with N-bromosuccinimide in the presence of a relatively small amount of bromine to produce $\Delta^8$-3-acetoxy-7,11,22,23-tetrabromo-ergostene, and reacting this compound with a dehalogenating agent comprising zinc and acetic acid to produce $\Delta^{7,9(11),22}$-3-acetoxy-ergostatriene.

6. The process which comprises reacting $\Delta^7$-dehydrotigogenin acetate with bromine to produce $\Delta^8$-7-11-dibromo-dehydrotigogenin acetate, and reacting this compound with zinc and acetic acid to produce $\Delta^{7,9(11)}$-bisdehydrotigogenin acetate.

7. The process which comprises reacting a $\Delta^7$-allo-cyclopentanopolyhydrophenanthrene compound, selected from the group which consists of $\Delta^{7,22}$-3-hydroxy-ergostadiene, $\Delta^{7,22}$-3-(lower alkanoyloxy)-ergostadiene, $\Delta^7$-dehydrotigogenin and $\Delta^7$-dehydrotigogenin 3-(lower alkanoate), with a brominating agent in a liquid medium substantially inert to halogenation and in the presence of a "Lewis base," said "Lewis base" being substantially inert to halogenation and non-reactive with halo radicals attached to the steroid nucleus, thereby forming the corresponding $\Delta^8$-7,11-dibromo-allo-cyclopentanopolyhydrophenanthrene compound.

8. The process which comprises reacting a $\Delta^7$-allo-cyclopentanopolyhydrophenanthrene compound, selected from the group which consists of $\Delta^{7,22}$-3-hydroxy-ergostadiene, $\Delta^{7,22}$-3-(lower alkanoyloxy)-ergostadiene, $\Delta^7$-dehydrotigogenin and $\Delta^7$-dehydrotigogenin 3-(lower alkanoate), with N-bromosuccinimide in the presence of a relatively small amount of bromine thereby forming the corresponding $\Delta^8$-7,11-dibromo-allo-cyclopentanopolyhydrophenanthrene compound.

9. The process which comprises reacting $\Delta^{7,22}$-3-(lower alkanoyloxy)-ergostadiene with bromine to produce $\Delta^8$-3-(lower alkanoyloxy)-7,11,22,23-tetrabromo-ergostene.

10. The process which comprises reacting $\Delta^{7,22}$-3-acetoxy-ergostadiene with bromine to produce $\Delta^8$-3-acetoxy-7,11,22,23-tetrabromo-ergostene.

11. The process which comprises reacting $\Delta^7$-dehydrotigogenin 3-(lower alkanoate) with bromine to produce the corresponding $\Delta^8$ - 7,11 - dibromo-dehydrotigogenin compound.

12. The process which comprises reacting together, in a halogenated hydrocarbon solvent, one molecular equivalent of $\Delta^{7,22}$-3-acetoxy-ergostadiene, approximately two molecular equivalents of N-bromosuccinimide, and slightly more than one molecular equivalent of bromine, thereby forming $\Delta^8$ - 3 - acetoxy-7,11,22,23-tetrabromo-ergostene.

13. The process which comprises reacting a $\Delta^8$-7,11-dihalo - allo - cyclopentanopolyhydrophenanthrene compound, selected from the group which consists of $\Delta^8$-3-(lower alkanoyloxy)-7,11,22,23-tetrahalo-ergostene and $\Delta^8$-7,11,23-trihalo-dehydrotigogenin 3-(lower alkanoate), with a dehalogenating agent to produce the corresponding $\Delta^{7,9(11)}$ - allo - cyclopentanopolyhydrophenanthrene compound.

14. The process which comprises reacting $\Delta^8$-3-(lower alkanoyloxy)-7,11,22,23-tetrabromo-ergostene with a dehalogenating agent selected from the group which consists of alkali metal iodides and alkaline earth metal iodides to produce $\Delta^{7,9(11)}$-3-(lower alkanoyloxy)-22,23-dibromo-ergostadiene.

15. The process which comprises reacting $\Delta^8$-3-acetoxy-7,11,22,23-tetrabromo-ergostene with sodium iodide to produce $\Delta^{7,9(11)}$-3-acetoxy-22,23-dibromo-ergostadiene.

16. The process which comprises reacting $\Delta^8$-7,11-dibromo-dehydro-tigogenin 3-(lower alkanoate) with a dehalogenating agent to produce the corresponding $\Delta^{7,9(11)}$-bisdehydrotigogenin compound.

17. $\Delta^{7,9(11)}$-3 - (lower alkanoyloxy) - 22,23 - dibromo-ergostadiene.

18. $\Delta^{7,9(11)}$ - 3 - (lower alkanoyloxy)-22,23-dichloro-ergostadiene.

19. $\Delta^{7,9(11)}$-3-acetoxy-22,23-dibromo-ergostadiene having a melting point of approximately 226° C.

20. $\Delta^{7,9(11)}$-bisdehydrotigogenin acetate having a single bromine radical attached to the C–17 side chain, and having a melting point of approximately 184° C.

21. $\Delta^8$-3-acetoxy-7,11,22,23-tetrabromo-ergostene, having a melting point of approximately 127° C.

22. $\Delta^8$-7,11-dihalo-dehydro-tigogenin 3-(lower alkanoate).

23. $\Delta^8$-7,11-dibromo-dehydro-tigoginin acetate.

24. Allo - cyclopentanopolyhydrophenanthrene compounds having an unsaturated linkage attached to the C–8 carbon atom selected from the group which consists of $\Delta^{7,9(11)}$-3-hydroxy-22,23-dihalo-ergostadiene, $\Delta^{7,9(11)}$ - 3-(lower alkanoyloxy)-22,23-dihalo-ergostadiene, $\Delta^{7,9(11)}$-23-halo-bisdehydrotigogenin 3-(lower alkanoate), $\Delta^8$-3-hydroxy - 7,11,22,23 - tetrahalo - ergostene, $\Delta^8$-3-(lower alkanoyloxy)-7,11,22,23-tetrahalo-ergostene, $\Delta^8$-7,11-dihalo-dehydrotigogenin and $\Delta^8$ - 7,11 - dihalo-dehydrotigogenin 3-(lower alkanoate).

25. A process which comprises reacting $\Delta^{7,22}$-3β- acetoxy-ergostadiene with bromine and reacting the formed compound with zinc and acetic acid to obtain $\Delta^{7,9(11),22}$-3β-acetoxy-ergostatriene.

References Cited in the file of this patent

UNITED STATES PATENTS 2,352,849  Marker _____ July 4, 1944